April 8, 1941.  P. H. MAURER  2,237,944

CLUTCH CONTROL MECHANISM

Filed July 19, 1937  4 Sheets-Sheet 1

INVENTOR
Paul H. Maurer.
BY
Dike, Calver & Gray
ATTORNEYS.

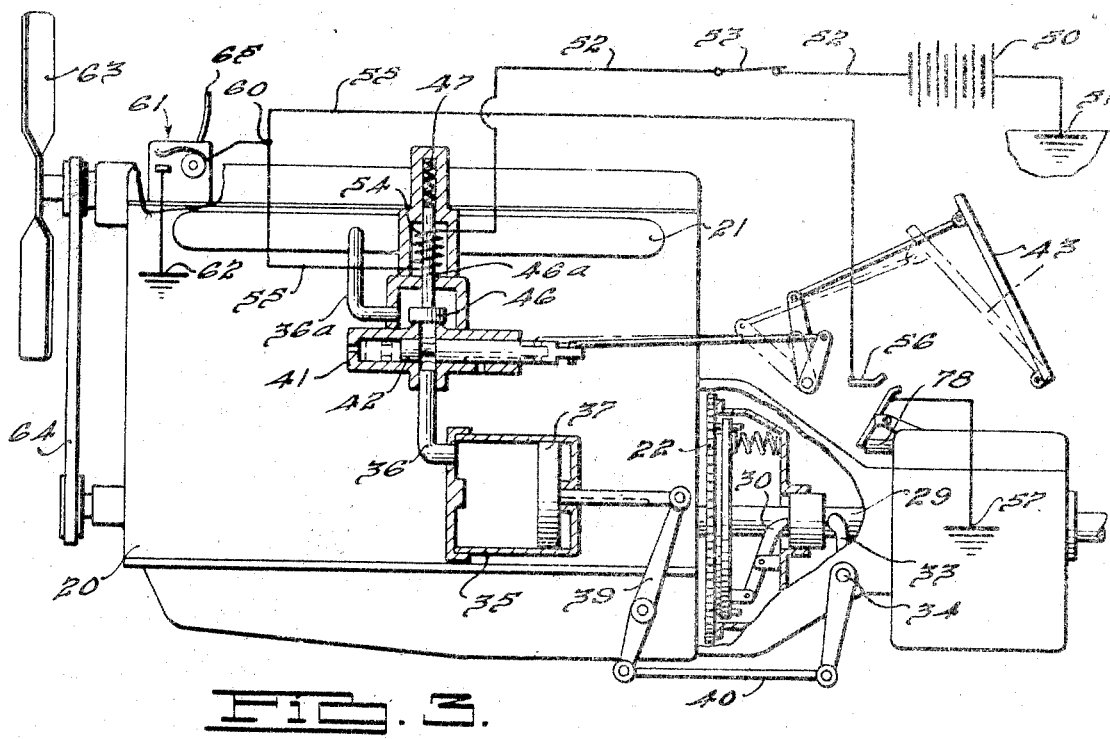
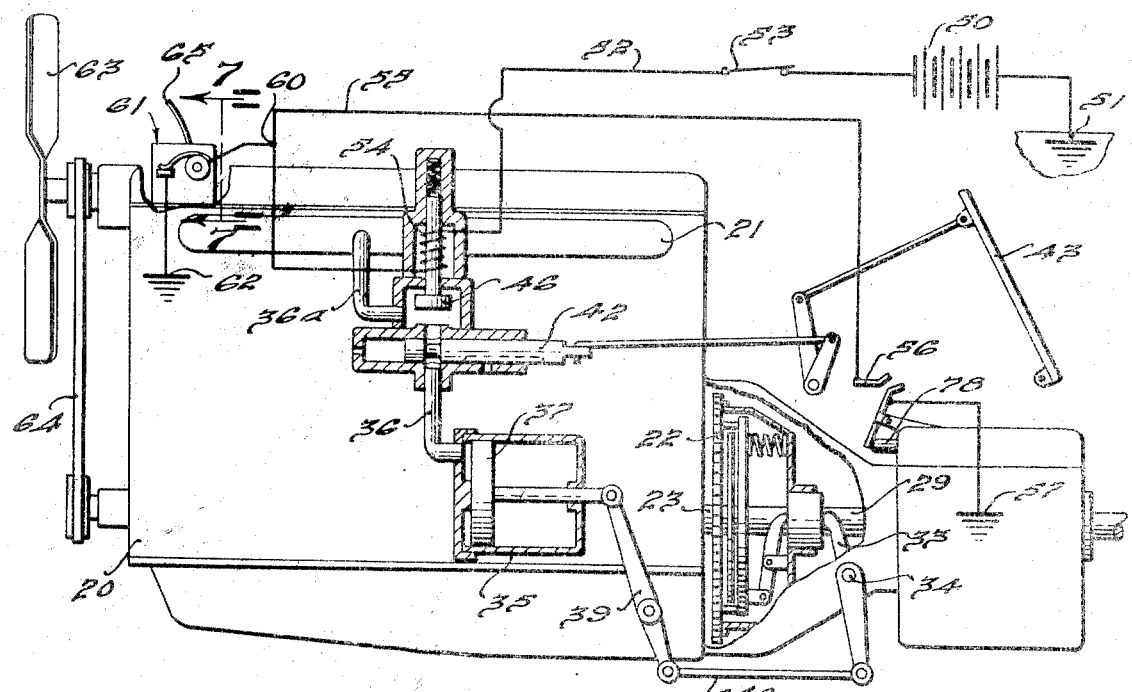

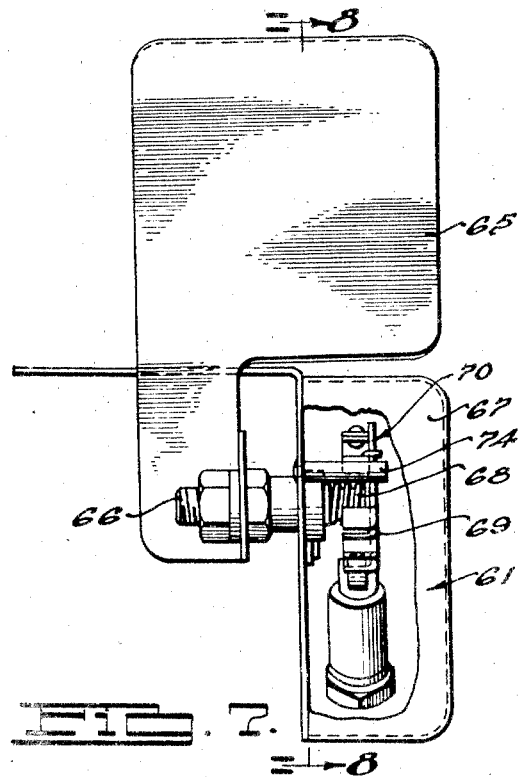
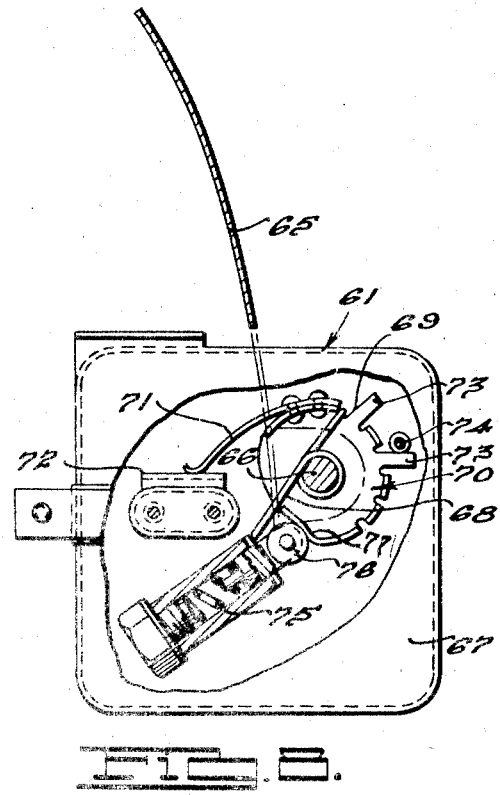
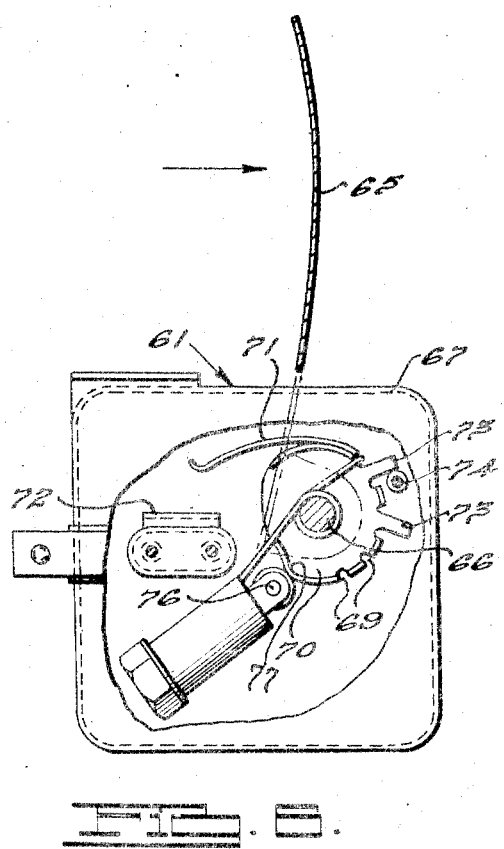
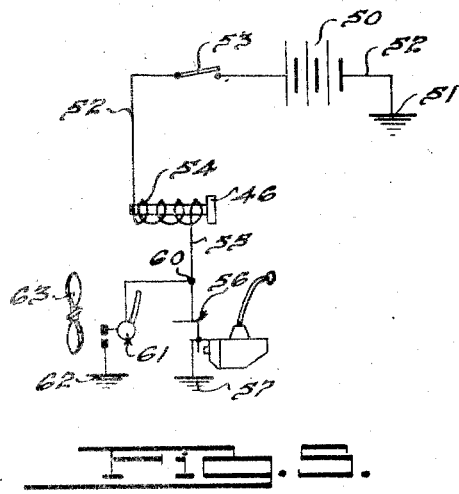

April 8, 1941.　　　P. H. MAURER　　　2,237,944

CLUTCH CONTROL MECHANISM

Filed July 19, 1937　　　4 Sheets-Sheet 4

INVENTOR
Paul H. Maurer.
BY Dike, Calver & Gray
ATTORNEYS.

Patented Apr. 8, 1941

2,237,944

UNITED STATES PATENT OFFICE 2,237,944

CLUTCH CONTROL MECHANISM

Paul H. Maurer, Birmingham, Mich., assignor to Hudson Motor Car Company, Detroit, Mich., a corporation of Michigan Application July 19, 1937, Serial No. 154,356

5 Claims. (Cl. 192—.01)

This invention relates to motor vehicles and more particularly to clutch control devices therefor designed generally for the purpose of automatically disengaging the clutch, when the accelerator pedal is released, in order to disconnect the driving wheels of a vehicle from the engine thereof, thereby effecting "free wheeling" operation of the vehicle and permitting shifting the gears without manually operating the clutch pedal.

Devices of the foregoing character utilize the increase of vacuum in the intake manifold of the vehicle engine produced by the pumping action of the engine and by the restriction of the intake passage thereof by the throttle valve when the accelerator pedal is released by the driver. Such devices commonly comprise a cylinder having a slidable piston therein connected with the aid of a suitable leverage with the clutch operating mechanism, means being provided to connect the cylinder at one side of the piston with the intake manifold of the engine, thereby permitting the manifold vacuum to act upon said piston and the leverage connected therewith, moving the same into position to effect disengagement of the clutch.

In practice it has been found that "free wheeling" of a vehicle is undesirable and in fact dangerous when the speed of the vehicle exceeds, for example, twenty-five or thirty miles per hour. This is largely due to the fact that when "free wheeling" occurs at higher speeds the beneficial braking effect of the engine is entirely lost, and the brakes alone have to be depended upon for stopping or slowing down the vehicle travelling at relatively high speed. This also results in greatly increased wear of the brake linings.

As a consequence, in the use of power plants utilizing vacuum type automatic clutch control it has been desirable to provide means whereby the automatic disengagement of the clutch during deceleration would be limited to vehicle speeds below a certain predetermined speed, such for example as twenty miles per hour, in order that braking effect of the engine could be retained at higher vehicle speeds. Several devices intended to perform the functions described have been devised.

In accordance with present usage a centrifugal governing device or switch similar in construction to a conventional centrifugal governor is employed for this purpose. In such devices the centrifugal force produced by rotating a plurality of weights is utilized to control a member adapted to interrupt the vacuum connection between the intake manifold and the vacuum operated cylinder, thereby rendering the clutch operating piston inoperative. However, numerous inherent disadvantages have been found in the centrifugal switches, and their use in combination with motor vehicles has presented numerous difficulties. One of such difficulties has been due to the fact that centrifugal switches must operate at low speeds and therefore they necessarily include relatively large masses. As the speed of the vehicle increases, the inertia forces developed in a device of this type reach such magnitudes that objectionably high loads are imposed on the switch parts as well as on the speedometer worm and gear from which the switch is usually driven. Another source of difficulties resides in the fact that with the clutch controls of the prior designs the clutch cannot be disengaged quickly enough to prevent stalling of the engine at a sudden application of brakes. The above made driving in traffic very difficult and was responsible for discharge of batteries.

In practice it has been found necessary to set centrifugal switches to operate and cause "free wheeling" at what in some cases may be an undesirably high speed. In addition, the inherent tendency of centrifugal governing devices to "hunt" before coming into a balanced position has complicated the problem still further, making the use of centrifugal switches in clutch control devices unsatisfactory.

It is one of the objects of the present invention to provide an improved clutch control device for a motor vehicle, which ensures automatic disengagement of the clutch when the accelerator pedal is released.

Another object of the invention is to provide improved means which render the automatic clutch disengaging means inoperative when the vehicle operated in high gear reaches a predetermined maximum speed, thereby preventing dangerous "free wheeling" at high vehicle speeds.

A further object of the invention is to provide improved clutch control means which effect a more satisfactory disengagement of the clutch before the vehicle is brought to a stop by application of the brakes.

A still further object of the invention is to provide a control switch which is very easy to actuate, and yet which is quickly responsive and comes into the proper position without hesitation or "hunting."

It is an added object of the invention to provide an improved clutch control device of the foregoing character, which is relatively simple in construction and dependable in operation, and which is relatively cheap to manufacture and is easy to service or repair.

Other objects of this invention will appear in the following description and appended claims, reference being had to the accompanying drawings forming a part of this specification wherein like reference characters designate corresponding parts in the several views.

Fig. 3 is a view similar in part to that of Fig. 1, illustrating conditions when the vehicle is just shifted into high gear.

Fig. 4 shows the conditions occurring when the vehicle operated in high gear is being stopped by a sudden application of brakes.

Fig. 5 is a diagrammatic view of the electric circuit controlling the solenoid valve, the same being shown separate from the engine for the sake of clarity.

Fig. 6 is a side view of the wind switch included in the electric circuit and controlling the same under certain conditions.

Fig. 7 is a front view of the switch shown in Fig. 6.

Fig. 8 is a view similar in part to that of Fig. 6, the switch being shown in its closed position.

Figure 1:
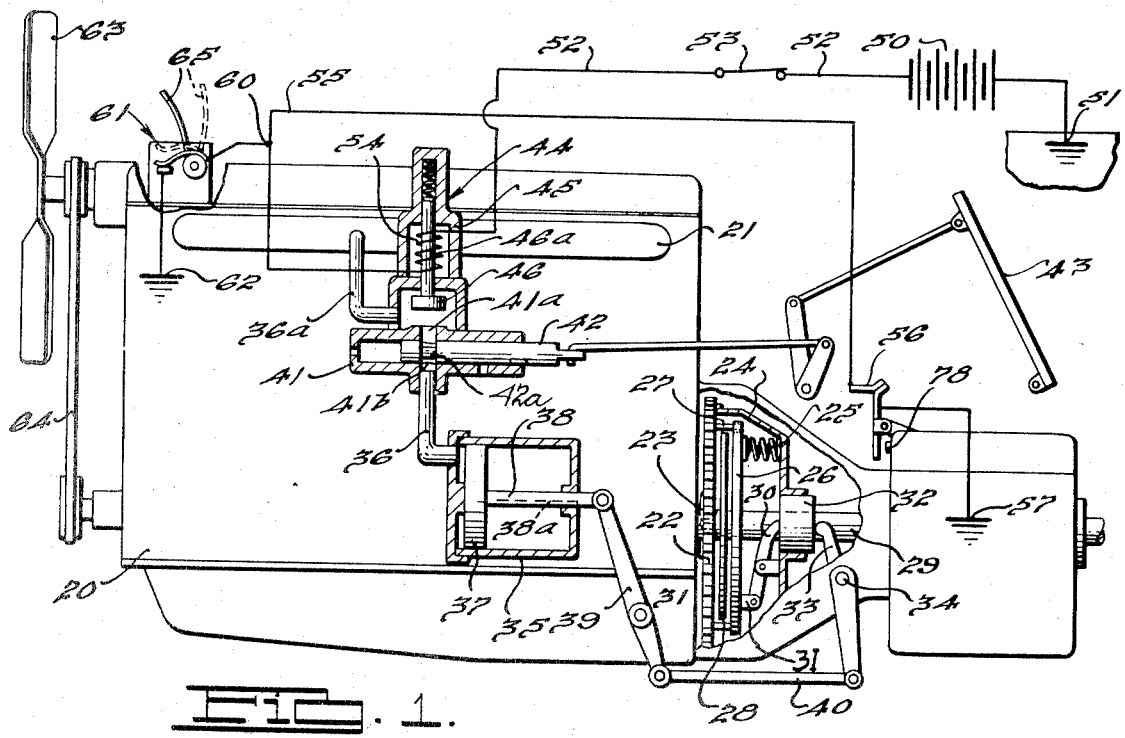
Fig. 1 is a side view, partly in section, of a vehicle engine embodying the present invention, the electrical circuit being diagrammatically shown thereon, illustrating driving conditions in low gears with the automatic clutch operating.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, a motor vehicle power plant embodying the present invention. With reference particularly to Figs. 1 to 4, the numeral 20 indicates generally an internal combustion engine of any desirable type having an intake manifold 21. At the rear end of the engine 20 there is provided a clutch mechanism which comprises a flywheel 22 secured to the rear end of the engine crankshaft 23. The bell housing 24 carries a plurality of compression springs 25 bearing upon a pressure plate 26 drivingly connected with the flywheel 22 by means of studs 27. The rear face of the flywheel 22 and the front face of the pressure plate 26 are adapted to bear against the faces of a driving plate 28 provided with suitable frictional surfaces. The driving plate 28 is drivingly connected with a transmission shaft 29, while the pressure plate 26 and the flywheel 22 are free to rotate independently of the transmission shaft but are constrained to rotate with the crankshaft 23, as explained. Thus, when the plate 26 comes in contact with the drive plate 28, pressing the same against the rear face of the flywheel 22, a frictional driving connection is effected between the crankshaft 23 and the transmission shaft 29.

Means are provided for the purpose of effecting disengagement of the above described driving connection between the crankshaft and the transmission shaft, which means in the present embodiment of the invention comprise a clutch throwout finger 30 fulcrumed between its ends, one end being pivotally connected at 31 to the pressure plate 26 while its other end bears against a shiftable collar 32. It is obvious that pressing the collar 32 forward will result in drawing the pressure plate back from the driving plate 28, thus releasing the frictional connection between the crankshaft and the transmission shaft. For pressing the collar 32 forward as described, there is provided a clutch shifter yoke 33 rockably mounted on the shaft 34. Means are provided whereby the yoke 33 presses the collar 32 forward as the clutch pedal (not shown) is pressed down by the driver of the vehicle. The description of said means is omitted since they do not form a part of the present invention and may be of any suitable type.

Automatic disengagement of the clutch is effected by means of a power cylinder 35 suitably supported, a conduit 36 connecting the power cylinder with the intake manifold of the engine, and a suitable linkage operated by the power cylinder. Within the cylinder 35 there is slidably fitted a piston 37 having a piston rod 38 connected by means of a hinged rock arm 39 and a rod 40 with the clutch shifter yoke 33. It can be clearly seen from an examination of the drawings that if communication is effected between the intake manifold 21 and the front end of the power cylinder 35 under conditions when there is a vacuum in the intake manifold, the piston 37 will be drawn forwardly until it reaches the end of the cylinder. Forward movement of the piston 37 operates the rock arm 39 and the rod 40, in consequence whereof the yoke 35 presses the collar 32 forward and disengages the clutch. Since the vacuum in the intake manifold is particularly strong when the accelerator pedal of the vehicle is in released position, it will be appreciated that disengagement of the clutch when the engine is idling is effected in a very strong and positive manner.

In order to prevent disengagement of the clutch in conditions other than idling, means are provided to interrupt under such conditions the vacuum connection between the intake manifold 21 and the power cylinder 35. Said means are exemplified by a valve device interposed in the vacuum conduit 36 and comprising a cylinder 41 in which there is slidably fitted a recessed valve 42 connected by means of suitable leverage and linkage with the accelerator pedal 43. Ports 41a and 41b are provided in the valve cylinder 41 and they communicate with the conduit 36.

The linkage connecting the accelerator pedal 43 and the valve 42 is so arranged that when the accelerator pedal is released (Fig. 1) the recess 42a of the valve 42 is positioned right against the ports 41a and 41b and, therefore, the communication of the intake manifold and the power cylinder is not interrupted and the vacuum is permitted to act on the piston 37. As the accelerator pedal is pressed down, the valve 42 moves into the position shown in Fig. 2, interrupting communication between the intake manifold and the power cylinder. Under these conditions the springs 25 will operate to keep the clutch firmly engaged and the collar 32 pressed backward, in consequence, whereof the linkage connecting the yoke 33 and the piston 37 will operate to move the piston into its extended position, as illustrated in Fig. 2.

In accordance with the present invention means are provided to interrupt the communication between the intake manifold 21 and the power cylinder 35 and to render the power cylinder inoperative when the vehicle operated in high gear exceeds a predetermined speed. Said means may be adjusted to operate at any desired speed, twenty miles per hour being chosen in the present instance, for example, as a maximum speed at which the automatic clutch disengaging means are permitted to operate. Above the speed of twenty miles per hour automatic operation of the clutch disengaging means ceases, and conventional operation of the clutch is reestablished. This feature of the invention eliminates any possible danger of automatically disengaging the clutch at higher vehicle speeds.

In the present embodiment of the invention, said means are exemplified by a solenoid operated valve indicated generally by the numeral 44. Referring to the drawings the solenoid valve comprises a casing 45 provided on the valve cylinder 41 at the port 41a thereof and communicating with the extension 36a of the vacuum conduit 36. In the present instance the casing 45 is formed integrally with the valve cylinder 41. In the casing 45 there is operatively arranged a solenoid operated valve 46 which is normally adapted to close the port 41a, thereby interrupting the continuity of the vacuum conduit 36, the closing of said valve being caused by the pressure spring 47.

In order to produce the desired operation of the automatic clutch the valve 46 should be open when the vehicle is operated in low gears, such as in first, second and reverse gears, and under such conditions the valve 42 alone controls the automatic clutch control means. When, however, the gears are shifted and the vehicle is being operated in high gear, the valve 46 should be kept open permitting the valve 42 to control the vacuum conduit only up to the predetermined speed, such as twenty miles per hour, at which speed the valve 46 should close rendering the valve 42 inoperative to control said vacuum conduit at any speed above said predetermined speed.

Figure 2:
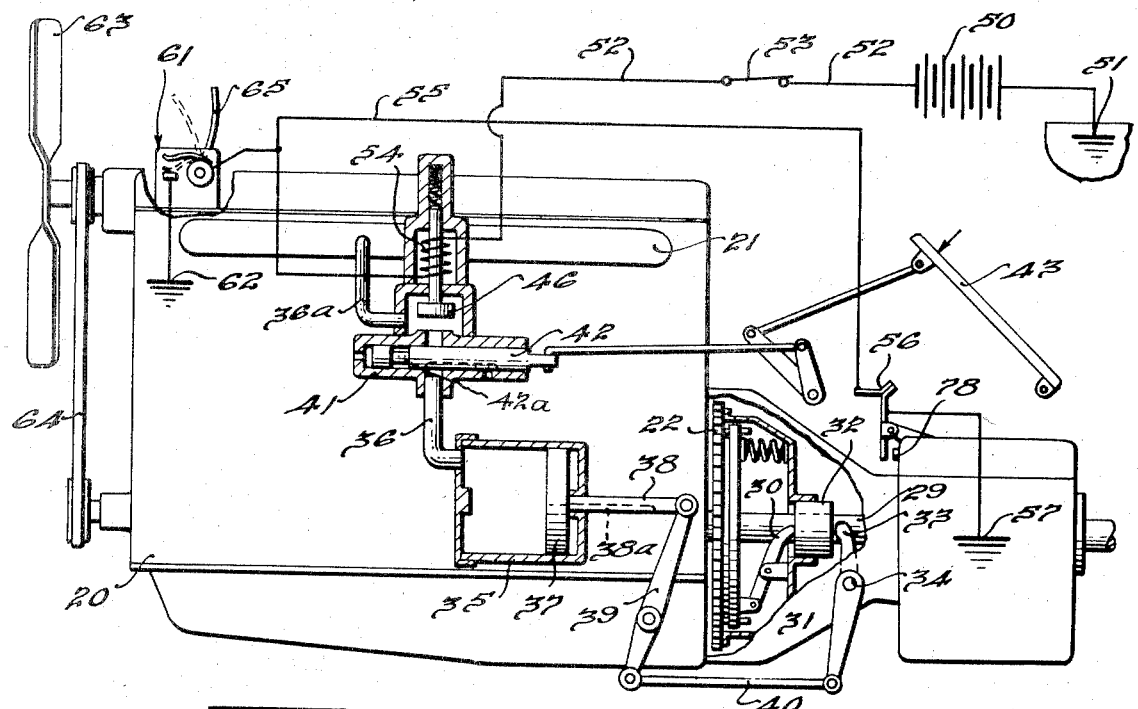
Fig. 2 illustrates the conditions which occur when the vehicle is being accelerated in low gears.
Figure 9:
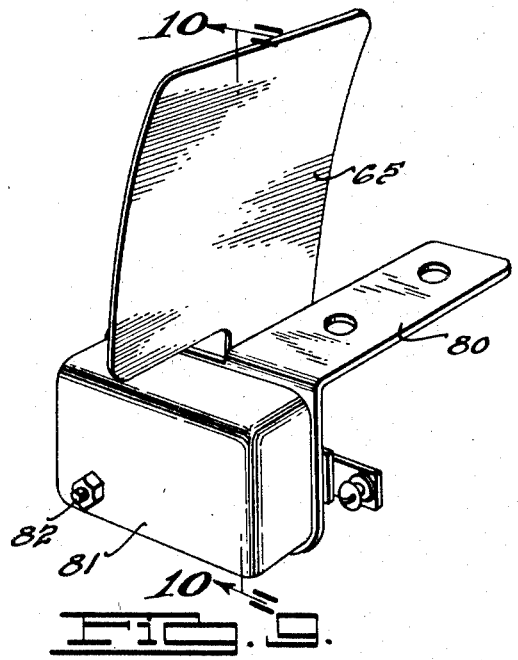
Fig. 9 is a perspective view of a modified wind switch embodying the present invention.
Figure 10:
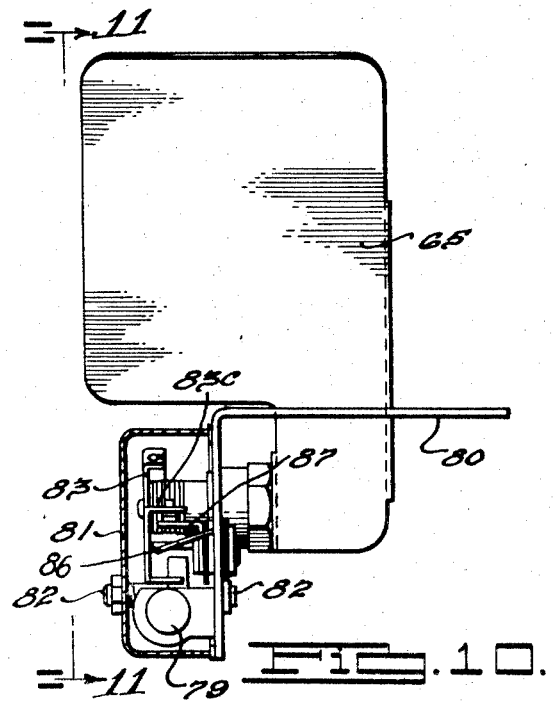
Fig. 10 is a view taken in the direction of the arrows on the line 10—10 of Fig. 9.
Figure 11:
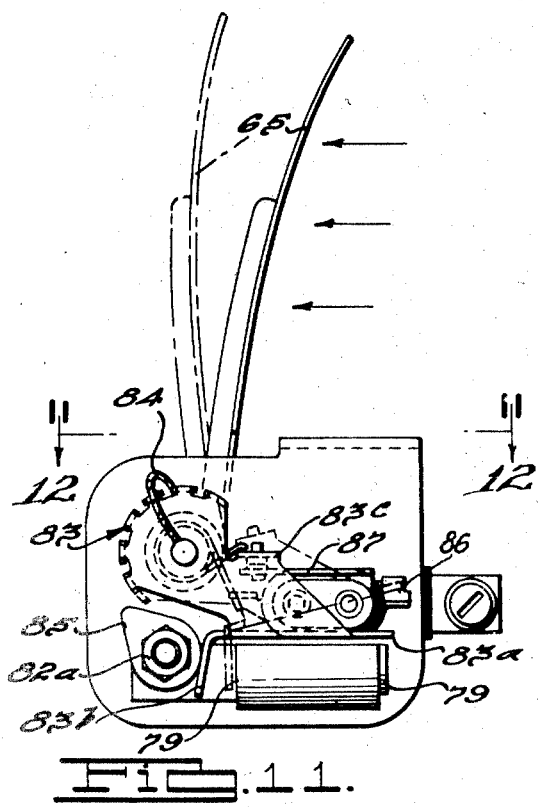
Fig. 11 is a side view of the wind switch of Fig. 9, the same being shown in its closed position, dotted lines indicating the respective positions of the switch parts when the same is in its open position.
Figure 12:
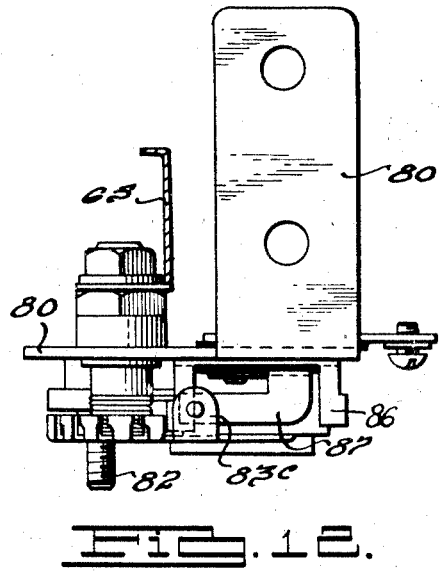
Fig. 12 is a top view illustrating the wind switch of Fig. 9, the upper part of the vane being removed along the line 12—12 of Fig. 11 in order not to obscure the working parts of the switch mechanism.

In the present embodiment of the invention such operation of the valve 46 is attained with the aid of an electric circuit indicated in Figs. 1 to 5 inclusive. The circuit comprises a source of electric energy 50, such for instance as a storage battery; one of the terminals of which is grounded on the vehicle structure as indicated at 51, while there is a conductor 52 connected to the other terminal of said source 50. A switch 53 is mechanically connected with the ignition switch (not shown) in order to prevent unnecessary discharging of the source when the vehicle is not operating. The conductor 52 is electrically connected with a solenoid winding 54, the stem 46a of the valve 46 serving as an armature for said winding. The other end of said winding is connected to a conductor 55 leading to the high gear switch 56 mounted on the transmission casing. The high gear switch 56, when closed, is grounded on the vehicle structure as indicated at 57. During operation of the vehicle in high gear this switch 56 remains open and is only closed to ground the same by the high gear shift rail when operated to shift out of high gear. When the switches 53 and 56 are closed, the electric current flows from one of the terminals of the source 50 through the conductor 52, winding 54, conductor 55, high gear switch 56 and through the ground points 57 and 51 back to the source 50. The flow of current through the winding 54 produces a magnetic field around the valve stem 46a, sufficient to pull the valve 46 up in opposition to the action of the spring 47, thereby opening the valve 46. Such condition is illustrated in Fig. 1.

If, however, the above described circuit is opened at either of the switches 53 or 56 the flow of the electric current ceases and the solenoid is deenergized, in consequence whereof the spring 47 presses the valve 46 down to close the port 41a, thereby interrupting the vacuum communication.

Means for opening the valve 46 when the vehicle is being operated in high gear and travels at or below the predetermined speed, such as any speed not exceeding twenty miles per hour, are exemplified by a parallel circuit or a subcircuit connected to the conductor 55 at a point 60 and including a wind switch 61, one of the terminals whereof is electrically connected through a conductor with the conductor 55 at point 60, while the other terminal is grounded on the vehicle structure as indicated at 62.

In the present embodiment of the invention the wind switch is operated by the air stream produced by the fan 63 driven from the engine crankshaft by means of a belt 64. The switch is of the vane type and, therefore, the energy of velocity of the stream is depended upon for actuating the switch. It will be understood, however, that the invention is not limited to the velocity type of vane, and that a switch including a pressure responsive membrane may be constructed in accordance with the invention. Since the speed of the vehicle in a definite gear, the high gear in the present instance, is proportional to the rotative speed of the engine, the velocity of the air in the stream produced by the fan 63 is also substantially proportional to the speed of the vehicle, and there is a certain velocity of the air in the stream that corresponds to the vehicle speed of twenty miles per hour.

The vane 65 of the switch is mounted on a shaft 66 journalled in a casing 67 suitably supported on the engine structure and in such a location that the vane 65 is arranged transversely to the direction of the air flow. The action of the air stream tends to throw the vane toward the rear of the vehicle, turning the vane on the shaft 66, which movement of the vane is opposed by the spring 68 anchored to the casing by one of its ends while its opposite end engages one of the notches 69 provided on the cam 70 mounted on the shaft 66 and constrained to rotate therewith. The resistance of the spring 68 may be changed by moving the end of the spring 68 into any desired notch of the series of notches 69, thereby changing the resistance which the vane 65 offers to the air stream. In the present embodiment the tension of the spring 68 and the area of the vane 65 are so selected that the vane 65 will not move until the velocity of the air in the stream reaches the value corresponding to the predetermined speed of the vehicle, such as twenty miles per hour. When said speed is reached, the vane is thrown rearward and the contact strip 71 is drawn away from the contact piece 72 breaking the circuit at the point where the strip 71 and the piece 72 normally touch each other, see Fig. 6.

Means for limiting the operative stroke of the vane are exemplified by two lugs 73 carried by the cam 70 and cooperable with a stop 74 secured on the casing 67. It is an important feature of the present invention that movement of the vane 65 and opening or closing of the switch is effected practically momentarily and without objectionable hesitation. Means effecting such movement of the vane 65 are exemplified in the present embodiment by a compression spring 75 suitably supported on the casing 67 and operating to press the follower 76 against the cam 70. A cam portion 77 cooperating with the follower 76 is so shaped that pressure of the follower produces a strong snappy movement of the vane 65 after it reaches its middle position, it being understood that the contact piece 71 is resilient and is so bent that it maintains the contact with the piece 72 until the vane 65 reaches said middle position. By virtue of such an arrangement there is produced a sharp line of separation between the speeds of the vehicle causing opening or closing of the wind switch in order to prevent undesirable repeated opening and closing of the switch when the car is being driven at the critical speed for a considerable length of time.

Another important feature of the present invention resides in the fact that the vane 65 has a sufficient weight inertia so that when the vehicle stops suddenly or is very rapidly decelerated by the sudden application of the brakes, the vane will be thrown forward by inertia to make contact between members 71 and 72. It will be understood that such forward movement of the vane 65 results in closing the wind switch at contacts 71 and 72 and completing the circuit therethrough.

It will now be clear in view of the foregoing that opening of the valve 46 may be effected in high gear by completing the electric circuit at the wind switch 61. It should be noted that in lower gears the circuit is always completed through the high gear switch 56 and that the valve 46 will be open irrespective of the position of the wind switch 61. On the other hand, when the transmission is in high gear, the circuit may be completed only through the wind switch 61, and therefore, under such conditions it is the wind switch that controls the automatic clutch operating means.

Figs. 1 and 2 illustrate conditions and the relative positions of the parts of the clutch control means when the vehicle is being operated in low gears and the clutch is operated automatically. It will be noted that under such conditions the high gear switch 56 is closed and the electric circuit is completed therethrough. This causes the solenoid valve 46 to remain open and, therefore, the movements of the wind switch 61 are immaterial. The clutch control means respond only to the movements of the valve 42 controlled by the accelerator pedal 43. If the pedal 43 is released, the clutch is disengaged automatically. If, on the other hand, the pedal 43 is pressed down as shown in Fig. 2, the vacuum communication between the engine manifold and the power cylinder 35 is interrupted, and the clutch is engaged by the action of the springs 25. It should be noted in this instance that provision of a slot 38a on the piston rod 38 prevents entrapment of air in the cylinder 35, while a similar slot on the valve 42 admits air into the power cylinder 35 for equalizing the pressure at both sides of the piston 37.

If under the conditions illustrated in Fig. 2, the accelerator pedal 43 is released for shifting into high gear, the respective positions of the clutch control means become as indicated in Fig. 4: the high gear shift rail 78 moves forward and opens the high gear switch 56, the wind switch is closed, the electric circuit is closed through the wind switch, causing the solenoid valve 46 to open. The clutch is still disengaged. If, however, the pedal 43 is pushed down for regular driving at speeds not exceeding twenty miles per hour, the valve 42 will move to interrupt the vacuum communication and to permit a firm engagement of the clutch. Thus when the vehicle is operated in high gear at speeds below twenty miles per hour, the solenoid valve is firmly held open, and therefore the automatic clutch control means operate in response to the release of the accelerator pedal 43.

However, as the vehicle increases its speed to the predetermined speed, such as twenty miles per hour, the velocity of the air in the air stream produced by the fan becomes sufficient to shift the vane 65 rearwardly, thus breaking the circuit, in consequence whereof the valve 46 is pressed down on its seat by the spring 47, interrupting the vacuum communication between the engine manifold and the power cylinder 35, and rendering the valve 42 inoperative. Such conditions are illustrated in Fig. 3. Thus, on vehicle speeds above the predetermined speed, movements of the valve 42 are immaterial, since the vacuum communication is permanently interrupted by the solenoid valve 46. In other words, at speeds above the set speed the clutch control means do not respond to the release of the accelerator pedal 43.

If under such conditions the brakes are suddenly applied causing rapid deceleration of the vehicle, the inertia of the vane 65 will cause it to continue its forward movement, thereby closing the wind switch. The closing of the wind switch 61 will complete the circuit therethrough, causing opening of the valve 46 as shown in Fig. 4. Since under such conditions the accelerator pedal 43 is released, there is a free communication between the intake manifold of the engine and the power cylinder 35. Hence, the vacuum existing in the manifold is permitted to act on the piston 37, thereby disengaging the clutch. Closing of the wind switch 61 is accomplished practically momentarily and, therefore, the clutch is disengaged before the engine is stalled. It is important to note that since the closing force developed in the switch because of the inertia of the vane 65 depends primarily upon the rate of deceleration of the vehicle and not directly upon the speed at which the vehicle is traveling at the moment of application of brakes, closing of the switch may be effected above the speed at which the switch normally closes, that is above the speed of twenty miles per hour in the present embodiment, whereby sufficient time is given to the clutch control mechanism to function and to effect disengagement of the clutch before the vehicle comes to rest. By proper selection of the weight and dimensions of the vane, it is possible to produce a switch which would close at any speed above the predetermined speed upon the sudden application of brakes.

Figs. 9 to 12 inclusive show a modified form of the wind switch in which magnetic means are employed to prevent hesitation of the vane 65.

Said means are exemplified by a magnet 79 mounted on the bracket 80 to which bracket a casing 81 is secured by means of a bolt 82. The magnet 79 cooperates with a cam bracket 83 having extensions 83a and 83b adapted to be pulled toward the magnet by the magnetic action thereof. The cam bracket 83 is provided with a plurality of notches similar to the notches 69 of the cam 70 of the preferred form of the switch and serving the same purpose. A conductor 84 is provided for the purpose of ensuring constant electric contact between the cam bracket 83 and the plate or bracket 80. The magnet 79 may serve also as means for limiting the working stroke of the vane 65. However, it may be desirable under certain conditions to decrease the initial force necessary to move the portions 83a and 83b from the magnet when they are in actual contact therewith. This may be done by an adjustable cam 85 secured on the bolt 82 by means of a second nut 82a, the cam 85 being so shaped that rotation thereof on the bolt 82 permits adjustment of the working stroke of the vane 65. A bracket portion 86 may be bent in order that the portion 83a comes in contact with it just before the portion 83b touches the magnet. The electric contact is established or broken by means of two contact pieces, one of them carried by the extension 83c while the other is secured to a resilient strip 87 riveted or otherwise secured to the bracket 80 but electrically insulated therefrom. Operation of the wind switch so constructed is substantially similar to that of the preferred form and no special detailed explanation thereof is deemed necessary.

Thus, considered from one of its broader aspects my invention contemplates providing improved control means for an automatic clutch, whereby automatic action of the clutch is ensured in the lower gears and in high gear at vehicle speeds below twenty miles per hour, above which speed the conventional operation of the clutch is reestablished. In addition, disengagement of the clutch by automatic means is ensured when the brakes are suddenly applied at any of the vehicle speeds, the response of the clutch control means being under such conditions practically momentary.

I claim:

1. In a motor vehicle having an engine with an intake manifold, a clutch, a transmission and a fan driven by the engine; a clutch control mechanism comprising a clutch operating vacuum cylinder operatively connected with said manifold, an electric circuit including a source of electric energy, a solenoid controlled valve electrically connected to said source and adapted to control the connection between said manifold and said cylinder, and a switch operated by the air stream produced by the fan, said switch being electrically connected to said source and to said solenoid controlled valve and being adapted to be closed when the vehicle is being operated below a predetermined speed, thereby completing the circuit and energizing said solenoid controlled valve.

2. In a motor vehicle having an engine with an intake manifold, a clutch, a transmission and a fan driven by the engine; a clutch control mechanism comprising a clutch operating vacuum cylinder operatively connected with said manifold, an electric circuit including a source of electric energy, a solenoid controlled valve electrically connected to said source and adapted to control the connection between said manifold and said cylinder, and a switch operated by the air stream produced by the fan, said switch being electrically connected to said source and to said solenoid controlled valve and being adapted to be closed when the vehicle is being operated in direct gear below a predetermined speed, thereby completing the circuit and energizing said solenoid controlled valve to open the vacuum connection between the engine manifold and clutch operating cylinder.

3. In a motor vehicle having an engine with an intake manifold, a clutch, a transmission and a fan driven by the engine; a clutch control mechanism comprising a clutch operating vacuum cylinder operatively connected with said manifold, an electric circuit including a source of electric energy, a solenoid controlled valve electrically connected to said source and adapted to control the connection between said manifold and said cylinder, and a switch operated by the air stream produced by the fan, said switch being electrically connected to said source and to said solenoid controlled valve, said switch adapted to be closed when the vehicle is being operated in direct gear below a predetermined speed and to be opened when the vehicle is being operated above said speed, said switch being further adapted to be closed by the inertia of its parts when brakes are applied at a vehicle speed exceeding said predetermined speed.

4. A clutch control mechanism for a motor vehicle having an engine with an intake manifold, a fan driven by said engine, and a clutch; said mechanism comprising a cylinder and a vacuum operated piston therein operatively connected with said clutch, said piston adapted to disengage the clutch when acted upon by vacuum; a vacuum connection between said cylinder and the intake manifold of the engine; means interrupting said vacuum connection when the accelerator pedal is actuated; a main electric circuit including a source of electric current and a solenoid valve having a winding electrically connected to said source, said valve adapted to interrupt said vacuum connection when said circuit is broken.

5. A clutch control mechanism for a motor vehicle having an engine with an intake manifold, a fan driven by said engine, and a clutch; said mechanism comprising a cylinder and a vacuum operated piston therein operatively connected with said clutch, said piston adapted to disengage the clutch when acted upon by vacuum; a vacuum connection between said cylinder and the intake manifold of the engine; means interrupting said vacuum connection when the accelerator pedal is actuated; a main electric circuit including a source of electric current and a solenoid valve having a winding electrically connected to said source, said valve adapted to interrupt said vacuum connection when said circuit is broken, and a parallel sub-circuit electrically connected to said main circuit, said sub-circuit including a switch adapted to be opened by the action of the air stream produced by the fan when the velocity of the air reaches a predetermined value, and to be closed when the velocity of the air falls below said value.

PAUL H. MAURER.